United States Patent Office 3,213,000
Patented Oct. 19, 1965

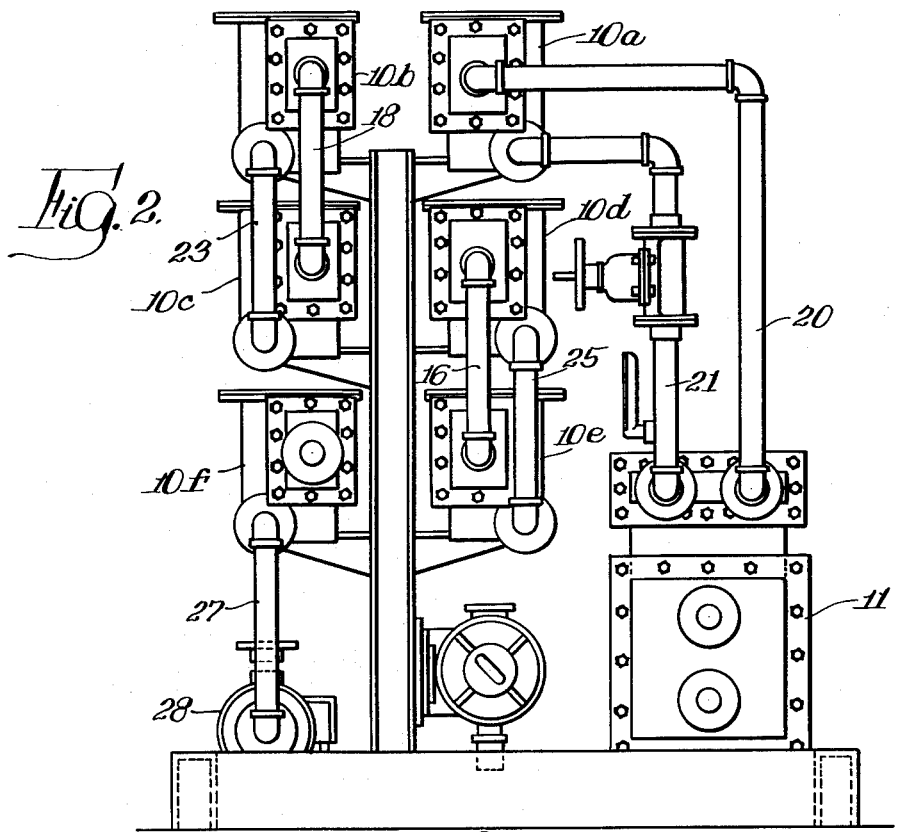
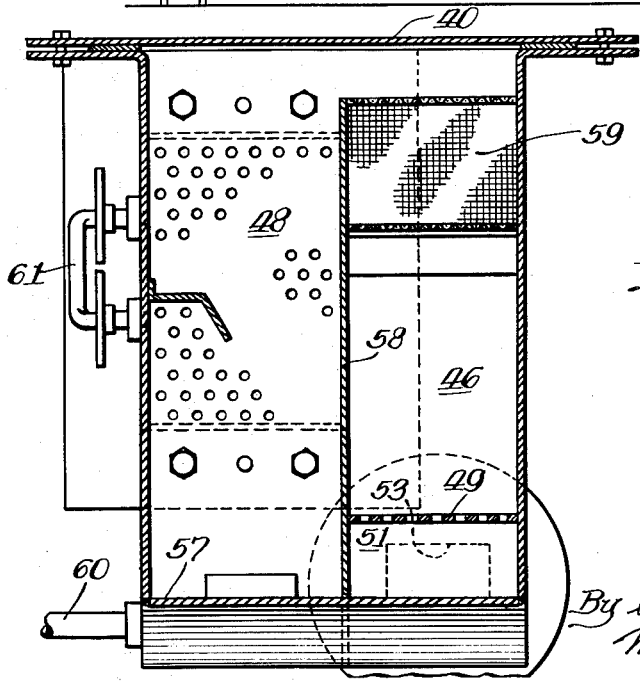

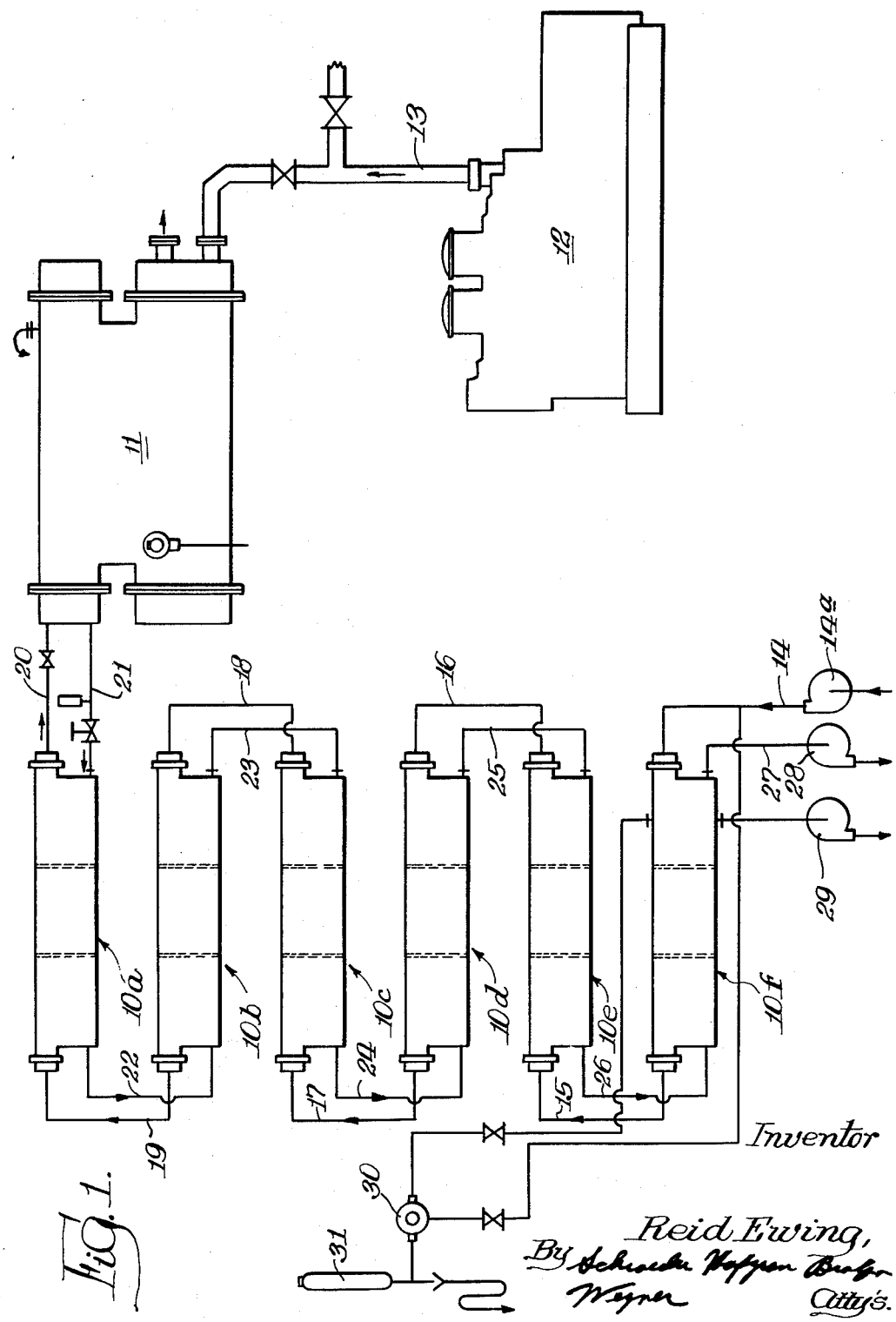

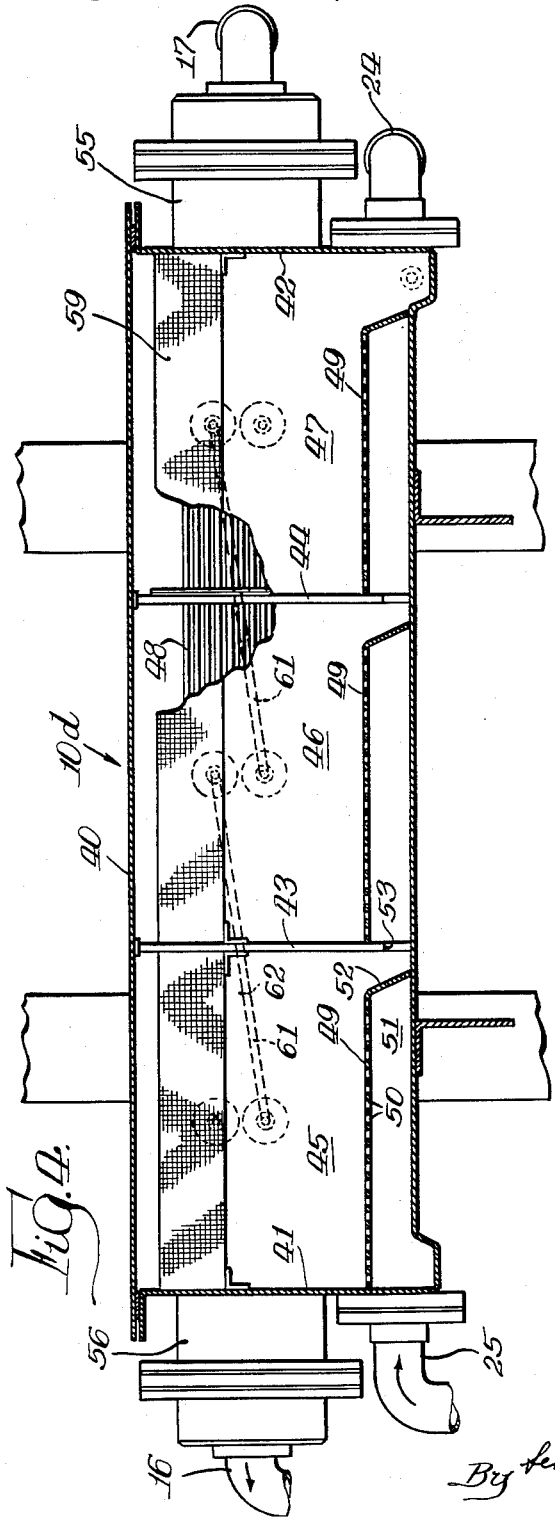
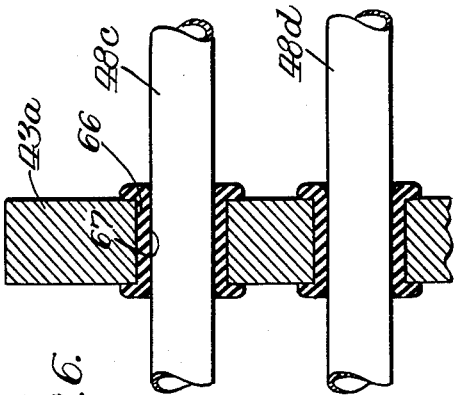
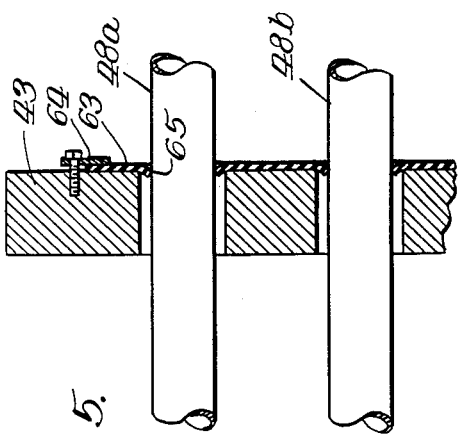

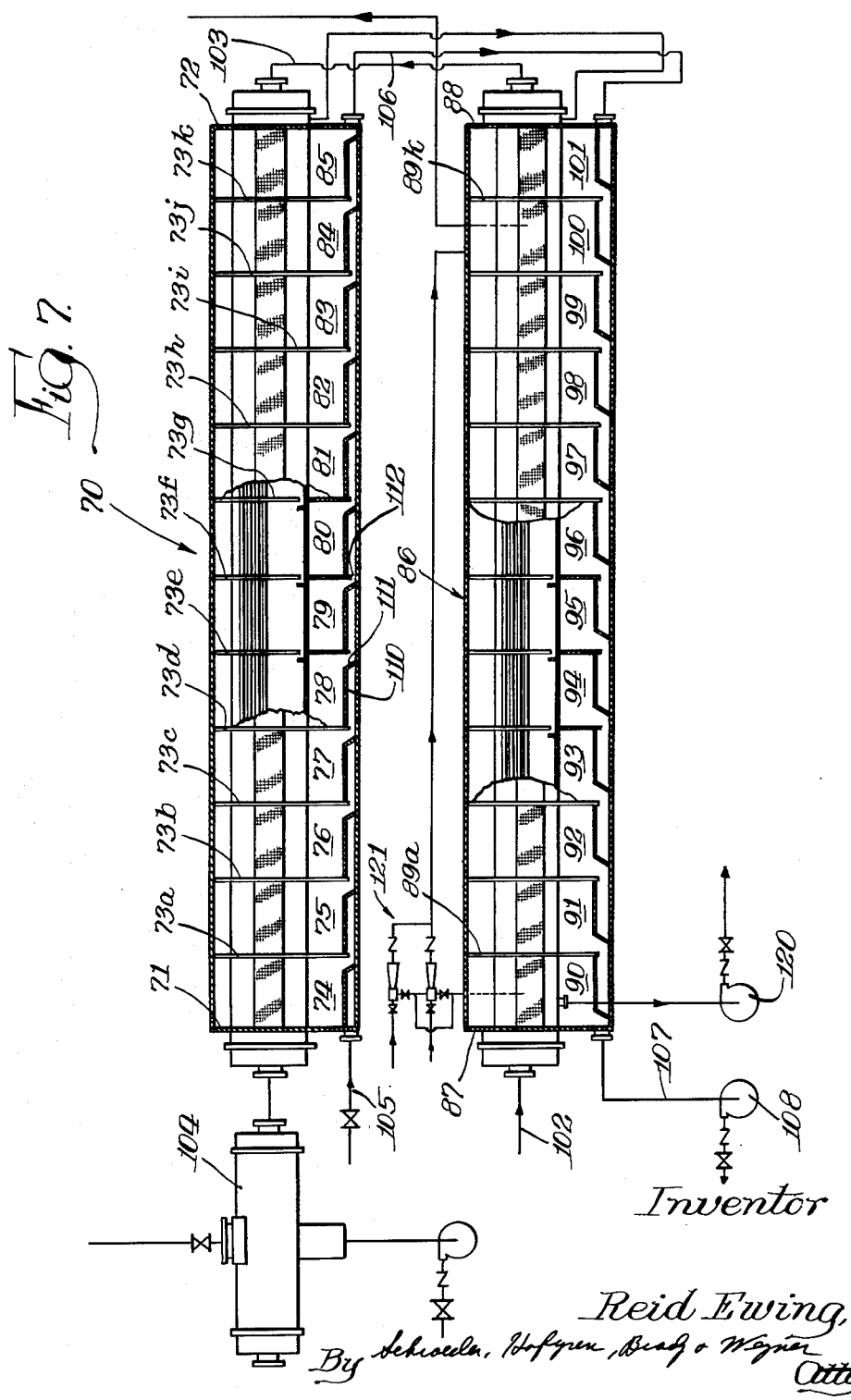

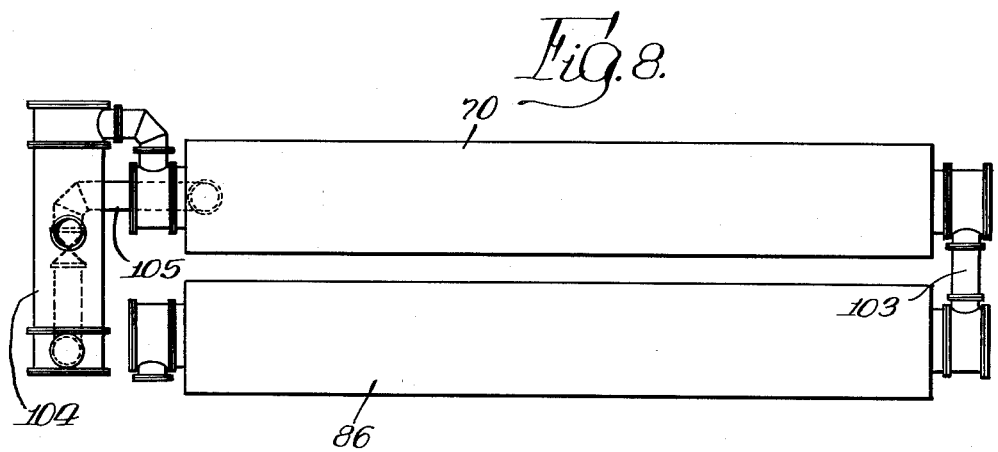
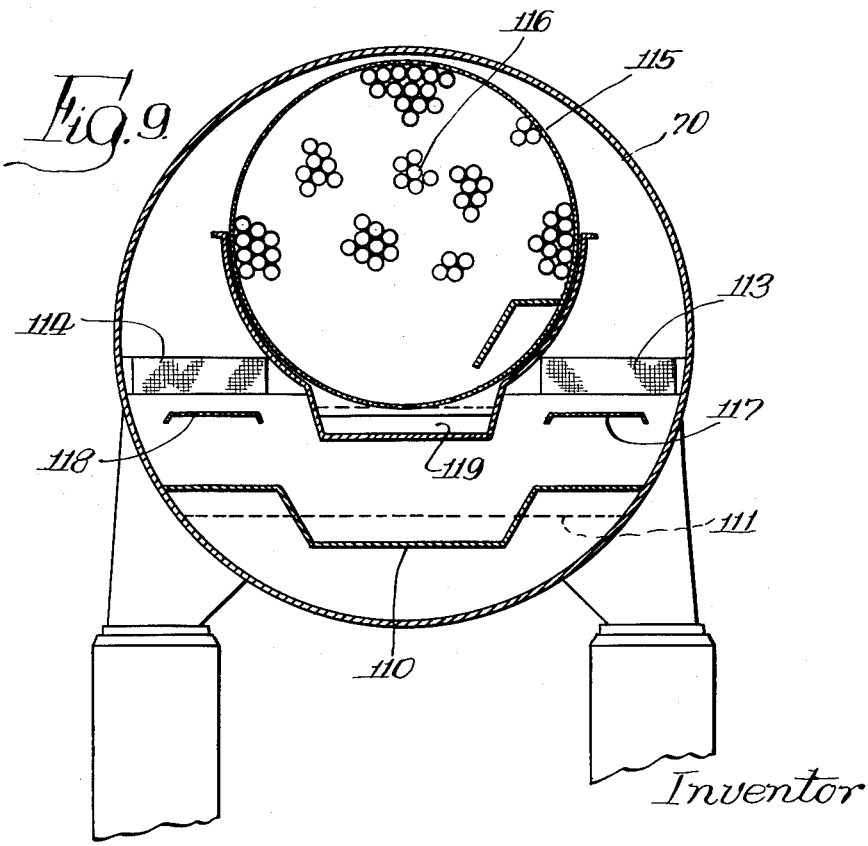

3,213,000
MULTIPLE STAGE FLASH EVAPORATOR
Reid Ewing, Huntington, W. Va., assignor, by mesne assignments, to Aqua-Chem, Inc., Waukesha, Wis., a corporation of Wisconsin
Continuation of abandoned application Ser. No. 766,787, Oct. 13, 1958. This application Dec. 5, 1958, Ser. No. 779,516
8 Claims. (Cl. 202—173)

This application is a continuation of my previous application Serial No. 766,787, filed October 13, 1958.

This invention relates to evaporators and more particularly to multi-stage evaporators of the flash type.

It is the general object of the present invention to produce a new and improved multi-stage flash evaporator of the character described.

The advantages of a flash type evaporator, particularly for conversion of salt water into fresh water, are well known. Using the principles of the flash evaporator wherein heated sea water (feed water) is introduced at a temperature below its boiling point into a flash chamber wherein the pressure is maintained below atmospheric, a flashing of a portion of the feed water into fresh water vapor will occur and this vapor may be condensed for use. Because the feed water is maintained at a temperature below which hard scale forms (normally about 175°–180°), the formation of scale is for the most part avoided and thus the maintenance of the unit is greatly simplified.

In many cases the unflashed feed water is passed through several chambers, each maintained at a lower pressure so that the flashing of water vapor occurs in several stages and the use of the multiple stages greatly increases the overall efficiency of the unit.

As the number of stages increases, however, both constructional and operational difficulties increase. For example, the flashed water vapor is normally condensed upon the exterior surfaces of a bundle of tubes in the condenser section of the evaporator. In the normal construction of tube bundles of this nature the feed water which is circulated through the condenser tubes passes back and forth through each stage a number of times, thus involving a number of reversals of flow direction. In the normal flash evaporator construction, relatively cool water is forced through the tubes to provide the temperature gradient necessary for condensation, the water generally being feed water directly from the sea or other source. Thus, in the normal construction the manufacture and assembly of the tube bundle creates a relatively difficult problem and, in addition, considerable pumping force and power is required to force the cooled feed water through the condenser tubes particularly where multiple stages are employed.

We have found that under purely theoretical considerations the actual area of heat transfer surface required in each tube bundle in a multi-stage flash evaporator is a function of a number of the stages which are employed in the system, and that as the number of stages increases the total square footage of heat transfer surface required decreases. This decrease in the total required heat transfer area is at its optimum value at around 20 to 24 stages with the curve approaching the horizontal beyond 26 stages so that the gain (in terms of reduction of area of heat transfer surface required) falls off markedly beyond 26 stages.

As previously indicated, however, multiplication of the number of stages in a flash evaporator has heretofore multiplied the problems involved in fabrication and pumping requirements as well as introducing considerations of heat loss due to the large exposed area of the housing for each of the stages. While the foregoing considerations would appear to rule out as a practical matter the construction of a flash evaporator having much over 6 or 8 stages, we have developed a design for a flash evaporator which so simplifies the construction thereof as to permit the use of a great number of stages, as high as 24 or even more, while simultaneously reducing the pumping force required even over that of an evaporator having half the stages. In addition, the construction and arrangement is such not only to minimize heat losses by direct radiation to the atmosphere but also to provide one in which the number of stages may be easily varied to suit particular needs.

As shown in the drawings and as will hereinafter be described in more detail, the flash evaporator contemplated by the present invention may comprise a single elongated casing or housing divided into the desired number of flash chambers or stages by partition, with the flow of heated feed water from chamber to chamber being in a direction opposite to the flow of cool water through the condenser tube bundle, an important consideration of the arrangement being the straight pass of the condenser tube bundle through all of the stages in the casing. Thus, each tube passes linearly from one end of the casing to the other and thus linearly through each of the chambers defined in the casing by the partitions. In this arrangement, the tubes are not bent back upon themselves in each stage and by the elimination of multiple reverse bends the pumping force required to circulate the relatively cool feed water through the tubes is quite low.

Thus it can be said that a further object of the invention is to produce a flash evaporator wherein an elongated casing is divided into a relatively large number of chambers or stages by partitions, and in which the tubes forming the condensers for each chamber extend generally parallel to each other and linearly through the casing from one end to the other.

Other and further objects and advantages of the present invention will be readily apparent from the following description and drawings, in which:

FIG. 1 is a schematic flow diagram of an evaporation system utilizing an embodiment of the invention;

FIG. 2 is an end view showing the apparatus schematically illustrated in FIG. 1, as embodied in a commercial type structure;

FIG. 3 is an enlarged vertical transverse sectional view taken through one of the evaporator casings shown in FIG. 2;

FIG. 4 is an enlarged vertical longitudinal sectional view through one of the evaporator casings shown in FIG. 2;

FIG. 5 is an enlarged detailed view of one form of sealing means between the tubes and the tube bundle and the partition separating chambers;

FIG. 6 is a view like FIG. 5 showing another modification of the sealing means;

FIG. 7 is a view like FIG. 1 of a modified arrangement of a flash evaporator embodying the principles of the invention;

FIG. 8 is a top plan view of the apparatus shown in FIG. 7; and

FIG. 9 is an enlarged vertical transverse section through one of the chambers shown in FIG. 7.

While this invention is susceptible of embodiments in many different forms, there is shown in the drawings and will herein be described in detail several embodiments, with the understanding that the present disclosure is to be considered as an exemplification of the principles of the invention and is not intended to limit the invention to the embodiments illustrated. The scope of the invention will be pointed out in the appended claims.

Referring now to FIG. 1 of the drawings, there is shown in the form of a schematic flow diagram an evaporator system employing the principles of the present invention. The evaporator is an 18-stage system employing six evaporator casings 10a–10f each consisting of three stages, making the over-all number of stages equal to the figure above given. Employed in the system is a salt water heater 11 utilized to supply heat in addition to the waste heat delivered from the diesel engine indicated at 12. The engine, of course, may be utilized for supplying power to any one or more of a number of devices, such as generators and the like, and the liquid utilized to cool the engine is passed by means of a pipe 13 through the heat exchanger in the salt water heater 11 and heat thereby imparted to the feed water. Additional heat in the form of steam is often required to bring the feed water to the desired temperature, in the neighborhood of 175° F.

Feed water directly from the source, such as the sea, is introduced into the system by means of a conduit 14 and pumped by pump 14a into the condenser tube bundle of the last stage of the evaporator casing 10f. This relatively cool feed water then passes by means of conduits 15–19 through the condenser tube bundles of each of the casings 10e–10a and thence by means of conduit 20 into the feed water heater 11. Obviously, in passing through the condensers of each stage of the evaporator the incoming feed water is heated and normally can be expected to reach the feed water heater at a temperature of the order of 150–160° F. Being heated to the desired temperature in the feed water heater, the feed water then exits therefrom through the passage 21 into the first stage of the casing 10a and upon exiting from the casing travels by means of passages 22–26 successively through each of the stages in each of the succeeding casings and finally is directed overboard or to waste through passage 27 and brine pump 28. A distillate pump 29 is connected to the final stage of the evaporator system to pump the distillate formed in the entire apparatus to a suitable place of use or storage.

A vacuum pump 30 is connected to the final stage of the system and by means hereinafter to be described, to each of the preceding stages of the system to remove non-condensable gases from the system. An exhaust snubber 31 connects to the outlet of the vacuum pump 30 in the usual manner.

Referring now to FIG. 2 of the drawings, there is shown a commercial type of evaporator utilizing the principles and the flow system described with reference to FIG. 1. It will be noted that the casings 10a–10f are generally rectangular in vertical cross-section with the piping extending alternately from either end of each casing, connecting thereby to the next higher and next lower casing in the series.

Referring to FIGS. 3 and 4, it will be noted that each of the evaporator casings 10a–10f (the casing 10d being chosen for illustration) is provided with a generally rectangular casing 40 having end walls 41 and 42 which, together with a pair of partitions 43 and 44, divide the casing into three separate chambers 45, 46 and 47. A tube bundle 48 consisting of a relatively large number of straight tubes passes linearly through each of the chambers 45–47. Thus, each of the tubes extends without a bend from one end wall 41 to the other 42. A plate 49 extends horizontally above and spaced from the bottom of each of the chambers with the plate 49 in each case being provided with a number of orifices 50 on the upper side of which flashing takes place. Heated feed water is introduced into the first chamber 45 through the passage 25 by means of which it enters the space 51 below the flash plate 49. The feed water passes through the flash plate being restrained by the weir 52 and thence flows over the plate and through an opening 53 into the space beneath the orifice plate in the chamber 46. The same action takes place in this chamber with the water flowing through the orifices in the plate and over the weir shown, and by means of an opening in the bottom of the partition 44 passes into the space beneath the orifice plate in the chamber and thence finally out of the exit passage 24.

Relatively cool feed water enters the tube bundle 48 by means of the conduit 17 and manifold 55, and passes directly to the manifold 56 at the other end of the casing 40 and thence into the conduit 16. As best shown in FIG. 3, water vapor condensing on the tubes of the tube bundle 48 may drop into the bottom 57 of the chamber below the tube bundle (and separated from the chamber 46 by the vertical longitudinal plate 58 and demister 59). Distillate collected in the bottom 57 is discharged through the conduit 60.

In order to permit the vacuum pump to remove non-condensable gases, the chambers are interconnected by means of vents 61, each provided with an orifice 62 to maintain the required pressure differential. The pressure differential is established and maintained by the temperature difference of the condensing water.

Referring now to FIGS. 5 and 6, two alternative means are shown for providing a seal between each of the partition plates and each of the tubes in the tube bundle. As shown in FIG. 5, the seal comprises a flexible sheet 63 secured by a securing means such as 64 to the partition 43, with the sheet being provided with openings smaller than the holes through the partition so as to create flaps 65, circular in form, which contact the exterior surface of the tubes 48a and 48b of the tube bundle 48. A somewhat modified form of construction is shown in FIG. 6 where, inserted in the holes in partition 43a, are spool-like members 66, each provided with a longitudinal hole 67 receiving the tubes 48c and 48d, with the spool member 66 preferably being made of some resilient material such as a plastic and preferably one which possesses a good deal of corrosion and heat resistance such as Teflon.

A somewhat modified form of evaporator system is shown in FIGS. 7–9 and referring to FIG. 7, there is shown an extensively elongated casing 70 circular in cross-section and closed at each end by end walls 71 and 72. Eleven partitions 73a–73k divide the casing 70 into twelve chambers 74–85. A second elongated casing 86 is constructed similarly to the casing 70 and thus is provided with end walls 87 and 88, partitions 89a–89k dividing the casing into twelve chambers or stages 90–101. Relatively cool feed water is introduced into the condenser section of the chamber 90 by means of the conduit 102 and after passing through the entire series of chambers within the casing 86, is introduced by means of the conduit 103 into the condenser section of the chamber 85 and thence successively through each of the ensuing chambers in the casing 70 and finally into the salt water heater 104. Heated salt water (175° F.) is delivered by means of the passage 105 into the first stage 74 of the evaporator. After passing successively through each of the ensuing eleven stages, the heated water is directed by means of the passage 106 into the chamber 101 from which it passes successively through the chambers in the casing 86 and thence into a passage 107 from which it is directed overboard by means of the brine pump 108.

Each of the chambers or stages within the casings 70 and 86 is constructed generally similarly to the chambers previously described. Referring to FIG. 9, it will be seen that there is provided in each chamber an orifice plate 110 terminating at one end in a weir 111 and communicating to the space beneath the orifice plate in the next lower chamber of the series by means of suitable openings 112 beneath each of the partitions. Demisters 113 and 114 are positioned in each chamber above the orifice plate and on either side of a generally circular, perforate housing 115 containing the tube bundle 116. To prevent large slugs of salt water from splashing directly against the underside of the demister, splash baffles 117 and 118 are provided.

Water condensing on the tubes in the tube bundle 116 is collected in a distillate trough 119 and finally collected by means of a distillate pump 120 and directed to a place of use or storage. Suitable means such as the vacuum system 121 are utilized for removing the noncondensable gases as in the previous construction. Each of the stages is maintained at a successively lower pressure so as to provide the pressure gradient necessary not only to cause the flow of heated feed water over the weir 111 from one stage into the next, but also to cause the flashing of fresh water vapors in each stage, in the same manner as in the previously described embodiments.

As previously indicated, a number of advantages flow from the constructions which may be evolved from the present invention. Referring to FIG. 8, it can be seen that the exterior surface of each of the casings 70 and 86 is relatively small and thus the heat losses are similarly attenuated. In each of the casings the tubes forming the tube bundle pass directly linearly and parallel to each other from one end wall casing to the other and hence pass in a straight line through each of the chambers. The pumping requirements are also considerably diminished particularly for the relatively cool feed water passing through the condenser tube bundles.

A comparison of a 12-stage conventional flash evaporator with a 24-stage flash evaporator of the type illustrated in FIGS. 7–9 is as follows:

| Design data | Number of stages | |
| --- | --- | --- |
| | 12 conventional | 24 countercurrent |
| Economy, lb. distillate/1000 B.t.u. | 5.5 | 5.5. |
| Capacity, g.p.d. | 1,180,000 | 1,180,000. |
| Velocity in tubes FPS | 4.0 | 4.0. |
| Required H.T.S., ft.² | 130,000 | 98,000. |
| Size of tubes | 1″ O.D., 18 BWG | ⅝″ O.D., 18 BWG. |
| Number of tubes | 1,465 per stage | 4,300. |
| Tube length, ft. | 28′ per stage | 67.5. |
| Total tube length, ft. | 336 | 135. |
| Required feed water rate at 85° F., g.p.m. | 11,650 | 11,650. |
| Feed pumping power, kw. | 220 | 169. |
| No. of shell sections | 12 | 2. |

From the foregoing the obvious saving in pumping power is clearly illustrated and the reduction in cost of manufacture, as well as operational costs, is substantial. Actually, a unit such as that shown in FIG. 7 can be almost completely fabricated at the factory rather than on the site, and shipped by freight car to its point of use, and by its economy of operation permits the use of fresh water obtained in this manner where heretofore the cost would have been prohibitive.

I claim:

1. A multiple stage flash evaporator comprising a casing, partitions in the casing defining a linearly aligned series of contiguous flash chambers, said partitions including sealing means for sealing each chamber from adjoining chambers, fluid passages interconnecting the chambers, a plurality of condenser tubes extending unbroken from end to end of the casing each tube passing generally linearly through each of the chambers in the casing and linearly into each next adjacent chamber, means for maintaining seriatim each chamber in the series at a lower pressure than the next rearward chamber in the series, means including said fluid passages for passing heated feed water forwardly successively through each of the chambers in the series, and pump means for forcing relatively cool feed water through the tubes countercurrently to the flow of heated feed water through the series of chambers.

2. The multi-stage flash evaporator of claim 1 wherein said condenser tubes extend substantially horizontally through the entire series of said chambers.

3. The multi-stage flash evaporator of claim 1 including baffle means in said chambers subjacent said fluid passages for precluding undesirable upward movement of slugs of feedwater.

4. A multiple stage flash evaporator comprising a casing, partitions in the casing defining a linearly aligned series of contiguous flash chambers, said partitions including sealing means for sealing each chamber from adjoining chambers, a plurality of condenser tubes extending unbroken from end to end of the casing each tube passing generally linearly through each of the chambers in the casing and linearly into each next adjacent chamber, means for maintaining seriatim each chamber in the series at a lower pressure than the next rearward chamber in the series, a generally horizontally extending perforated plate in each chamber overlying and spaced from the bottom of the casing, each of said partitions being provided with an opening near the bottom thereof to provide a fluid passage interconnecting each chamber with each adjacent chamber, a weir in the bottom of each chamber to maintain the level of liquid therein between said opening and said weir above said opening, means for introducing heated feed water into the chamber first in the series beneath the perforated plate therein for flow over said plate and said weir and through the opening successively forwardly into and through the series of chambers, and pump means for forcing relatively cool feed water through the condenser tubes countercurrently to the flow of heated feed water through the series of chambers.

5. The multi-stage flash evaporator of claim 4 wherein the upper edge of the weir in each chamber is coterminous with the forward edge of the perforated plate therein.

6. A multi-stage flash evaporator housed in a single casing, internal partition walls in said casing dividing said casing into one line of at least two adjacent stages arranged one behind the other, said partition walls including sealing means for sealing each stage from adjoining stages, a heater compartment and an associated flash chamber compartment located adjacent thereto in each stage, means connecting said heater compartment and said flash chamber compartment in each stage whereby flashed vapor may be passed from said flash chamber compartment to said heater compartment, tube means in said heater compartments of said stages for conveying brine through said heater compartment and arranged to be heated by said flashed vapor passed to said heater compartments, a nest of tubes forming said tube means and providing a plurality of continuous brine heating surfaces in at least two adjacent heater compartments located in at least two adjacent stages, said tubes of said nest passing from one of said two heater compartments through one of said internal partition walls common to said two heater compartments, said tubes of said nest forming at least the main part of the brine heating surface in said two adjacent heater compartments.

7. A multiple stage flash evaporator comprising a casing, a plurality of partitions in said casing dividing the same into flash chambers, said partitions terminating above the bottom of the casing to provide a fluid passage therebeneath interconnecting the chambers, a weir in the bottom of each chamber to restrain the flow of fluid through said flash chamber, there being a multiplicity of linearly aligned flash chambers in the casing, a plurality of straight condenser tubes extending substantially linearly from end to end of the casing and substantially linearly through each flash chamber and means for circulating relatively cool water through said tubes whereby said cool water in the tubes makes but a single pass through the casing.

8. A multiple stage flash evaporator comprising a casing, a plurality of partitions in said casing dividing the same into flash chambers, means adjacent the lower portion of said partitions providing a fluid passage interconnecting the chambers, means in the bottom of each chamber including an orifice plate to restrain the flow of fluid through said flash chambers, there being a multiplicity of linearly aligned flash chambers in the casing, a plurality of straight condenser tubes extending substantially linearly from end to end of the casing and substantially linearly through each flash chamber and means for circulating relatively cool water through said tubes whereby said cool water in the tubes makes but a single pass through the casing.

References Cited by the Examiner

UNITED STATES PATENTS

| | | |
|---|---|---|
| 11,883 | 10/84 | Sewell. |
| 526,208 | 9/94 | Wheeler. |
| 2,447,259 | 8/48 | Lucke. |
| 2,613,177 | 10/52 | Worthen et al. _____ 202—174 |
| 2,759,882 | 8/56 | Worthen et al. _____ 202—174 X |
| 2,865,445 | 12/58 | Buchler _____ 159—23 X |

OTHER REFERENCES

Chemical Engineering, October 1956, McGraw-Hill, New York, N.Y. (page 126 relied upon).

NORMAN YUDKOFF, *Primary Examiner.*

MILTON STERMAN, JOSEPH B. SPENCER, RICHARD D. NEVIUS, *Examiners.*